United States Patent [19]

Hlavaty

[11] Patent Number: 4,866,895
[45] Date of Patent: Sep. 19, 1989

[54] GLASS TO SASH CHANNEL ATTACHMENT
[75] Inventor: David G. Hlavaty, Allen Park, Mich.
[73] Assignee: General Motors Corporation, Detroit, Mich.
[21] Appl. No.: 318,861
[22] Filed: Mar. 6, 1989
[51] Int. Cl.⁴ .............................................. E06B 7/00
[52] U.S. Cl. ...................................... 52/208; 52/400; 52/823
[58] Field of Search ................. 52/716, 823, 208, 400, 52/824

[56] References Cited
U.S. PATENT DOCUMENTS
4,730,432  3/1988  Schafer et al. ......................... 52/716
4,762,904  8/1988  Nakama ............................. 52/823 X FOREIGN PATENT DOCUMENTS
607716  11/1960  Canada ................................... 52/823

Primary Examiner—David A. Scherbel
Assistant Examiner—Lan Mai
Attorney, Agent, or Firm—William A. Schuetz

[57] ABSTRACT

A one-piece plastic attachment for connecting a window glass to its associated sash channel. The attachment is generally U-shaped to define a bottom, a first side wall and a second side wall integrally hinged to the bottom. The side walls carry snap fastener elements to enable the attachment to be readily snap fittingly connected to the glass and are provided with deflectable wings to enable the attachment to be readily snap fittingly connected to the sash channel.

5 Claims, 3 Drawing Sheets

GLASS TO SASH CHANNEL ATTACHMENT

The present invention relates to an attachment for connecting a window glass to its associated sash channel and, more particularly, to a one piece plastic attachment which can be readily snap fittingly attached to the glass and then readily snap fittingly attached to the sash channel.

Currently there are several different means or methods employed for attaching a movable door glass window to its associated sash channel in automotive vehicles. A frequently used method is that of riveting the glass to the channel. In this method the glass is provided with a plurality of through openings adjacent its lower edge and the sash includes a U-shaped portion for receiving the glass and having openings there through which align with the openings in the glass. Rivets or rivets attached to locator studs are then employed to secure the glass within the U-shaped portion of the sash channel. Another commonly used method includes hot melt processes in which adhesives are applied to the glass and/or U-shaped portion of the sash channel and then given time to cure in order to bond the glass to the sash channel.

The present invention provides ye another method or means for quickly and readily attaching a window glass to its associated U-shaped portion of the sash channel. Instead of rivets and/or locator studs, one piece plastic members are snap fittingly connected to the window glass adjacent its lower edge portion and then the plastic members are snap fittingly connected to the U-shaped portion of the sash channel.

Accordingly, it is a broad object of the present invention to provide a new and improved attachment for attaching a window glass to a sash channel which provides for a quick and ready installation and is of a simple and economical construction.

A further object of the present invention is to provide a new and improved attachment for attaching a window glass having transverse openings adjacent its bottom edge to a sash channel having transverse openings therethrough, and in which the attachment means comprises a one piece plastic part having a bottom and a pair of spaced opposed side walls and with one of the side walls being connected to the bottom via an integrally formed hinged means so that it can be readily pivoted toward and from the other of the side walls, and wherein each of the side walls has an integrally formed deflectable wing whose normal free state position is such that it extends outwardly from the plane of its associated side wall, and in which a snap fitting fastener means comprising cooperable fastener elements integral with the side walls for snap fittingly connecting the side walls together to form an attachment with is U-shaped when the cooperable element on the one side wall is snap fittingly connected to the cooperable element on the other side wall, and in which the window glass is connected to the sash channel by positioning the bottom edge of the glass against the bottom of the attachment and with the cooperable elements being received in said openings in the glass and snap fittingly connected together and then inserting the glass and attachment means into the sash channel and with the wings on the sides of the attachment being deflectable from their normal free state position towards each other until the wings are aligned with the openings in the sash channel where upon the wings, due to their self biasing forces, return toward their normal free state position and lockingly retain the attachment and glass to the sash channel.

Yet another object of the present invention is to provide a new and improved attachment, as defined in the next preceding object, and wherein the cooperable fastener element on one of the side walls comprises a transversely extending sleeve having a radially inwardly extending lip which is received within an opening in the glass and the other of the cooperable elements on the other side wall comprises a barbed projection which is slotted and which is adapted to be deflected radially inwardly as it engages the lip on the sleeve of the other cooperable element until it snaps there behind to lockingly retain the two sides of the attachment against the sides of the glass.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

The present invention provides a novel one piece plastic attachment or attachment means 10 which can be readily snap fittingly attached to a window glass 12 and than readily snap fittingly attached to its associated sash channel 14. Although the novel attachment 10 could be used in various applications where it is desired to attach a window glass to its associated sash channel, it is particularly adapted for use in attaching a movable window glass to an associated sash channels in automotive vehicle applications, such as a side window glass in a side door of an automotive vehicle.

Figure 4:
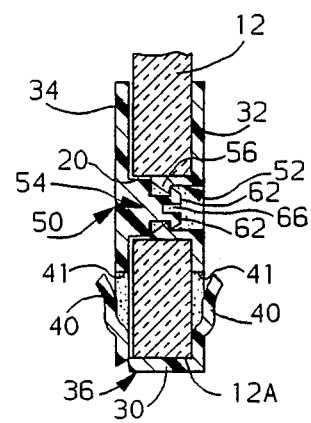
FIG. 4 is a view like that shown in FIG. 3, but showing the attachment being fully connected to the window glass.
Figure 5:
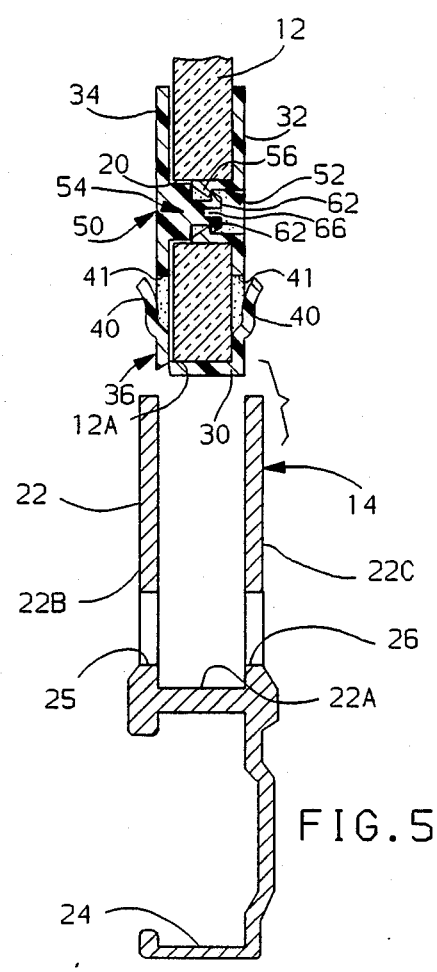
FIG. 5 is a sectional view of the attachment of the present invention being connected to the window glass and with the attachment and window glass being positioned above a sash channel for connection therewith.

As best shown in FIGS. 3-7, the window glass 12 is provided with a transverse opening 20 adjacent to, but spaced upwardly from, its lower edge 12A at a plurality of horizontally spaced locations along the bottom of the window glass 12. The sash channel 14 is made from metal and comprises an upper channel 22 which is U-shaped and a lower channel 24. The upper U-shaped sash channel 22 has a bottom 22A and left and right side walls 22B and 22C, as shown in FIG. 5. The channel 22 has its open top facing upwardly and is also provided with transverse openings 25 and 26 in its side walls 22B and 22C which are aligned with each other. The channel 24 has its open side disposed horizontally at the bottom of the sash channel 22 and is adapted to receive a roller or slider of a suitable window regulator mechanism mounted in the door of the vehicle (not shown) for raising and lowering the window glass 12.

Figure 1:
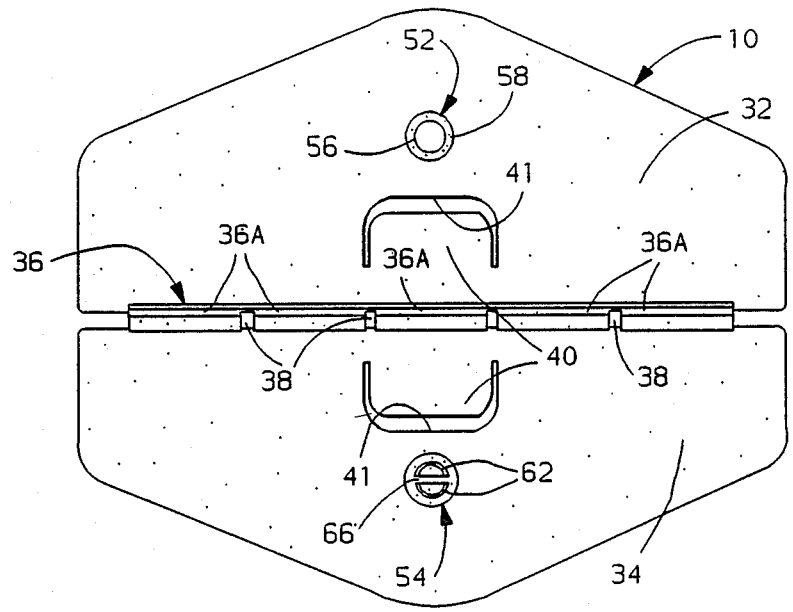
FIG. 1 is a plan view of the novel attachment of the present invention and showing the same in an open flat condition.
Figure 2:
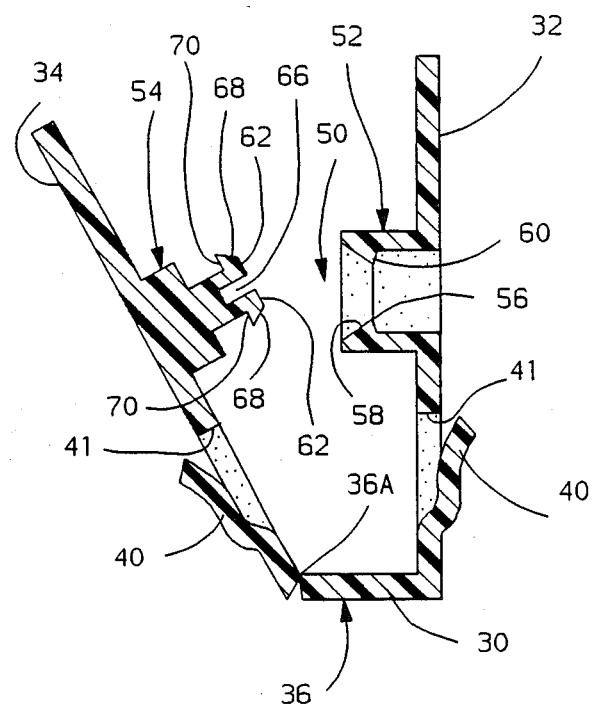
FIG. 2 is a reduced sectional view of the attachment means of the present invention and showing the same in the as condition.
Figure 3:
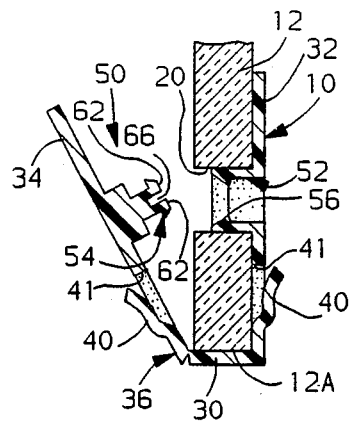
FIG. 3 is a view like that shown in FIG. 2, but showing the attachment being partially connected to the window glass.

The novel attachment 10 comprises a one piece member molded from a suitable thermo plastic material to the configuration shown in FIG. 2 of the drawings. As thereshown the attachment 10 has a planar bottom wall 30, a planar right side wall 32 and a planar left side wall 34. The side wall 34 is integrally connected with the bottom wall 30 via an integral hinge or hinge means 36. As best shown in FIG. 1, the hinge means 36 comprises a plurality of hinge portions 36A which are separated from each other by through openings 38. The hinge means 36 is a reduced thickness so as to enable the side wall 34 to be pivoted about the longitudinal axis of the hinge means in opposite directions. The side walls 32 and 34 are shaped so as to be of a greater height at their mid portion than at their opposite ends, as viewed in FIG. 1. The attachment 10 in the as molded condition has the shape or configuration, as viewed in section, as shown in FIG. 2.

Each of the side walls 32 and 34 has an integrally formed wing 40 which extends outwardly from the plane of its associated side wall. As best shown in FIG. 1, the wings 40 are surrounded by U-shaped slots 41 in the side walls 32 and 34 and at their base are integrally formed with the side walls 32 and 34.

The attachment 10 also includes a snap fitting fastener means 50 which comprises cooperable fastener elements 52 and 54 formed integral with the side walls 32 and 34, respectively. The cooperable fastener element 52 is in the shape of a circular sleeve which extends inwardly and perpendicularly of the side wall 32. The sleeve 52 adjacent its end remote from its integral connection with the side wall 32 defines a radially inwardly extending lip 56. The lip 56 is annular and has a tapered entry surface 58 at its free end and defines an annularly extending shoulder 60 at its opposite side which faces toward the side wall 32.

The cooperable fastening element 54 is formed integral with the side wall 34 and comprises a headed projection 62 extending transversely inwardly from the side wall 34. The projection 62 at its head or free end is slotted as indicated by reference numeral 66 to define two semi-circular barbed end sections 68. The barbed end sections 68 are tapered at the right most end so it be complimentary with the taper on the annular lip 56 of the sleeve 52 and each define a semi-circular extending shoulder 70 at their leftmost end which faces toward the side wall 34.

The attachment 10 is adapted to be readily attached to the window glass 12. To this end, the lower end of the window glass 12 need merely be inserted between the side walls 32 and 34, when the attachment is in the position shown in FIG. 2. When the bottom edge 12A of the window glass engages the bottom 30 of the attachment 10, the sleeve of the cooperable fastener element 52 can be inserted through the opening 20 in the window glass to position the side wall 32 against one side of the window glass 12. Then the other side wall 34 of the attachment 10 can be pivoted about the hinge means 36 so that the barbed projection 62 is received within the opening 20 in the window 12. As the barbed projection 62 is received within the opening 20 in the window 12, the tapered free end thereof will engage the tapered end 58 of the annular lip 56. Further movement of the side wall 34 towards the glass 12 will cause the semi circular barbed end sections 62 to be deflected towards each other until the barbed end sections 62 clear the annular lip 56 on the sleeve 52. When this occurs, the self biasing forces of the thermal plastic material of which the barbed sections are made will cause the barbed section 62 to return to their normal free state position and lock behind the annular lip 56. That is the shoulders 70 on the barbed sections 68 will engage the shoulder 60 on the annular lip 56 to securely lock the attachment to the glass 12, as shown in FIG. 4. In this position, both side walls 32 and 34 are vertically disposed and parallel with the opposite side edges of the associate sides of the glass 12.

Figure 6:
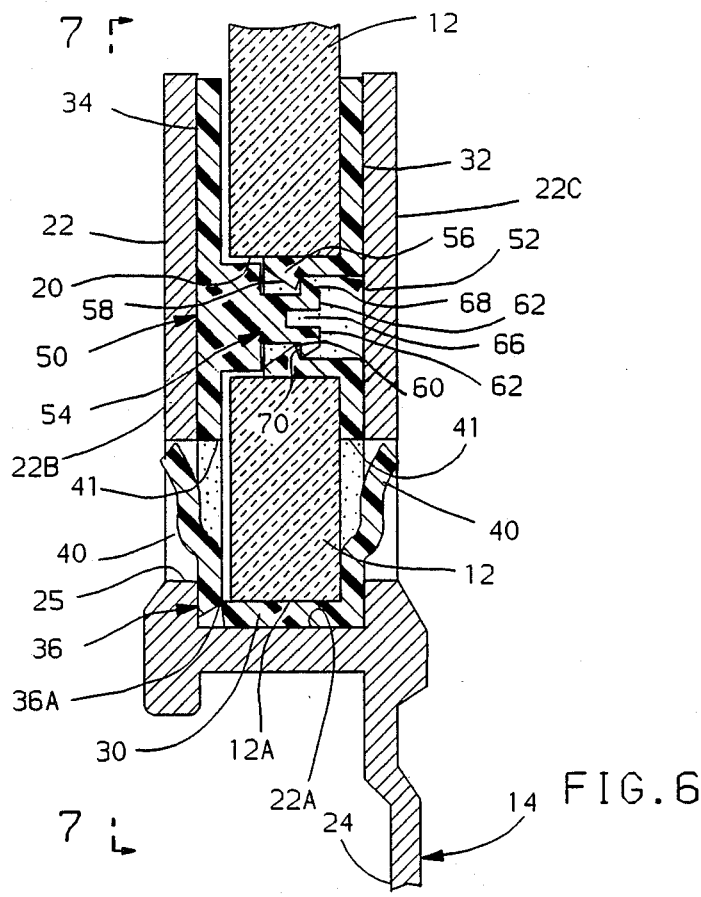
FIG. 6 is a view like that shown in FIG. 5, but showing the attachment and the window glass fully connected to the sash channel

The glass 12 and attachment 10 can then be readily attached to the sash channel 22 by merely inserting the attachment and bottom edge of the glass into the sash channel 22, as shown in FIG. 5. As the attachment means 12 is inserted in the sash channel 22, the wings 40 will be caused to be deflected from their normal free state position, as shown in FIG. 5, in which position the transverse dimension between the free ends of the wings 40 is greater than the thickness between the walls 22B and 22C of the channel 22. As the wings 40 are deflected inwardly from their normal free state position, they will slide on the inner surfaces of the walls 22B and 22C of the sash channel 22 until the attachment means is positioned at the bottom 22A of the sash channel 22. At this time, the wings 40 will be positioned adjacent the openings 25 and 26 in the channel 22 whereupon they will be self biased outwardly away from each other due to their self biasing forces toward their normal free state position and with the result that the wings 40 will be disposed within the openings 25 and 26 in the side walls 22B and 22C of the sash channel 22, as shown in FIG. 6. This locks the attachment 10 in place on the glass channel 22.

Figure 7:
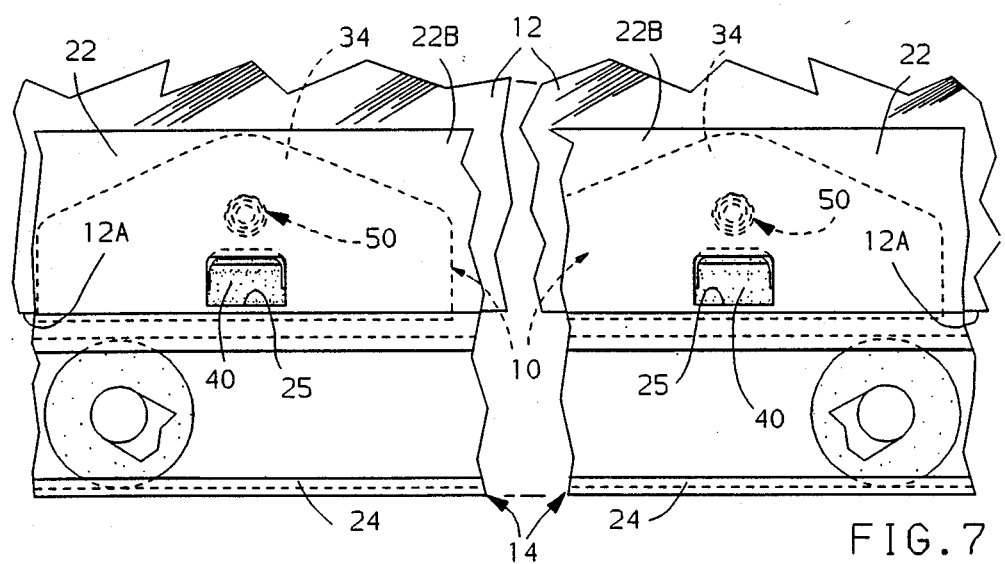
FIG. 7 is a reduced fragmentary side elevational view looking in the direction of the arrow 7—7 of FIG. 6.

It will, of course, be understood that in applications, such as a movable side door window in an automotive vehicle door, that a plurality of horizontally spaced attachment means 10 (as shown in FIG. 7) would be employed to connect the lower edge of the glass 12 to its associated glass channel 22.

From the foregoing, it should be apparent that a novel attachment 10 for connecting a window glass to its associated sash channel has been provided. It should further be apparent that the novel attachment means 10 can be readily attached to the window glass 12 and then readily attached to the sash channel 22. In addition it should be noted that, since the attachment means 10 is of a one piece plastic construction, it will be relatively rattle free due to the engagement of the plastic with the metal sash channel 22 and the window 12. It can be further seen that the one piece attachment is of an economical construction, has very little mass and can be readily and easily installed without the need of any adhesives or separate assembly procedures involving attaching rivets, etc.

Although the illustrated embodiment thereof has been described in great detail, it should be apparent that certain modifications, changes and adaptations may be made in the illustrated embodiment, and that it is intended to cover all much modifications, changes and adaptations which come within the spirit of the present invention.

The embodiments of the invention in which an exclusive property or privilege is claimed are defined as follows:

1. In combination, a window glass having a transversely extending opening therethrough adjacent its bottom edge, a sash channel including a U-shaped portion defined by a bottom and a pair of opposed sides having aligned transverse openings therethrough, and attachment for connecting the glass to said U-shaped portion of said sash channel, said attachment comprising a one piece plastic part having a bottom and a pair of spaced opposed side walls, one of said side walls being connected to said bottom via an integrally formed hinge means so that it can be pivoted toward and from the other of said side walls, each of said side walls having an integrally formed deflectable wing whose normal free state position is such that it extends outwardly from the plane of its associated side wall, snap fitting fastener means comprising cooperable fastener elements integral with said side walls for connecting said side walls together to form an attachment which is U-shaped when the cooperable element on said one side wall is snap fittingly connected to the cooperable element on said other side wall, said window glass being connectable to said sash channel by positioning said bottom edge of said glass against said bottom of said attachment means and with the cooperable element on said other of said sides being received in said opening in said glass, pivotally moving said one side about said hinge means toward said glass until the cooperable element thereon snap fitting connects to said cooperable element on said other side wall so that the attachment engages both sides of said glass and then inserting said glass and attachment into said U-shaped portion of said sash channel, said wings an said sides of said attachment being deflectable from their normal free state position toward each other as the attachment means is inserted into said sash channel until said wings are aligned with said openings in said U-shaped portion of said sash channel whereupon said wings due to their self biasing forces return toward their normal free state position and lockingly retain the attachment and glass to said sash channel.

2. The combination, as defined in claim 1, and wherein said cooperable fastener element on said other side wall of said attachment comprises a sleeve extending transversely of said other side wall and having a radially inwardly extending lip defining an annular shoulder facing toward the outer side of said other wall, and wherein said cooperable fastener element on said one wall comprises a circular shaped projection having a barbed radially inwardly deflectable head portion, said head portion upon engaging said lip on said sleeve of said fastener element on said other side wall being deflected radially inwardly until the head portion clears said lip whereupon said head portion returns toward its normal free state position to lock behind said shoulder on said lip to connect the cooperable fastener elements together when said one side wall is being pivoted toward said other side wall to connect the attachment to said glass.

3. The combination, as defined in claim 2, and wherein said head portion has a plurality of deflectable barbs, each of which defines a shoulder facing toward said one side wall and with the latter shoulders engaging said shoulder on said lip of said cooperable fastener element on said other side wall when connected thereto.

4. The combination, as defined in claim 3, and wherein said head portion of said cooperable fastener element on said one side wall is diametrically slotted to define two generally semi-circular, radially outwardly extending barbs.

5. The combination, as defined in claim 4, and wherein, said plastic attachment is molded and in the as molded condition has said one side wall at its free end spaced from said other side wall at its free end a distance greater than the width of said glass so that the glass can be freely received therebetween.

* * * * *